United States Patent
Ghetie et al.

(10) Patent No.: US 11,392,703 B2
(45) Date of Patent: *Jul. 19, 2022

(54) SYSTEMS, APPARATUSES, AND METHODS FOR PLATFORM SECURITY

(71) Applicant: Intel Corporation, Santa Clara, CA (US)

(72) Inventors: Sergiu D Ghetie, Hillsboro, OR (US); Neeraj S. Upasani, Portland, OR (US); Sagar V. Dalvi, Hillsoro, OR (US); David P. Turley, North Plains, OR (US); Jeanne Guillory, Hillsboro, OR (US); Mark D. Chubb, Tacoma, WA (US); Allen R. Wishman, Cornelius, OR (US); Shahrokh Shahidzadeh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/708,652

(22) Filed: Dec. 10, 2019

(65) Prior Publication Data

US 2020/0110880 A1    Apr. 9, 2020

Related U.S. Application Data

(63) Continuation of application No. 15/283,381, filed on Oct. 1, 2016, now Pat. No. 10,515,218.

(51) Int. Cl.
*G06F 21/57* (2013.01)
*G06F 21/72* (2013.01)

(52) U.S. Cl.
CPC .......... *G06F 21/575* (2013.01); *G06F 21/72* (2013.01)

(58) Field of Classification Search
CPC .............................. G06F 21/575; G06F 21/72
See application file for complete search history.

(56) References Cited

U.S. PATENT DOCUMENTS

| | | |
|---|---|---|
| 9,032,196 B1 | 5/2015 | Marr et al. |
| 2014/0365755 A1 | 12/2014 | Liu et al. |
| 2016/0055113 A1* | 2/2016 | Hodge ................. G06F 21/575 710/308 |
| 2016/0063254 A1 | 3/2016 | Jeansonne et al. |
| 2017/0085383 A1* | 3/2017 | Rao .......................... G06F 8/654 |
| 2017/0220802 A1* | 8/2017 | Huang ................. G06F 21/575 |
| 2017/0255567 A1 | 9/2017 | Vidyadhara et al. |

* cited by examiner

*Primary Examiner* — Stefan Stoynov
(74) *Attorney, Agent, or Firm* — Nicholson De Vos Webster & Elliott, LLP

(57) ABSTRACT

Embodiments detailed herein include, but are not limited to, a hardware processor to execute instructions and security circuitry to perform pre-boot operations including signature verification of a portion of firmware in a firmware storage hardware and initiating recovery upon a signature verification failure. The hardware processor comprises a plurality of cores in some embodiments. The hardware processor a multicore processor in some embodiments.

21 Claims, 19 Drawing Sheets

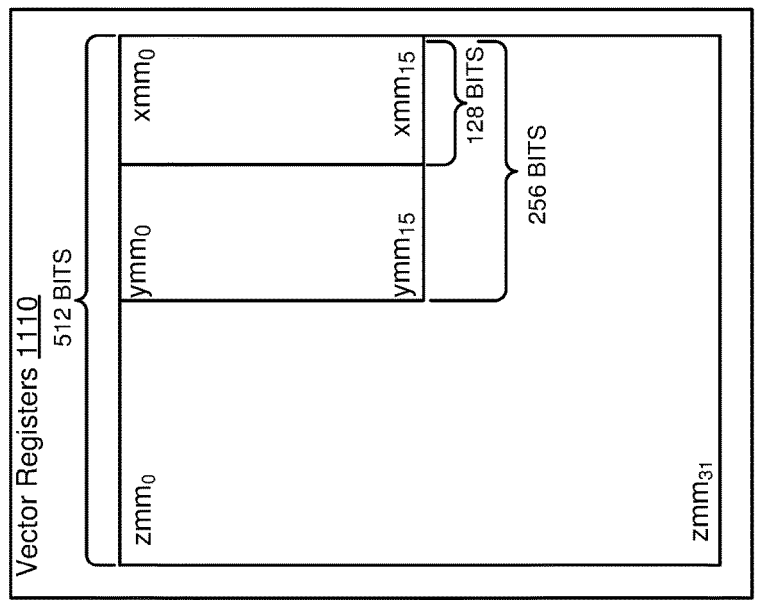
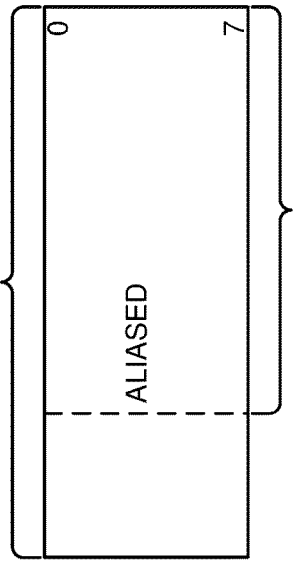
FIG. 11

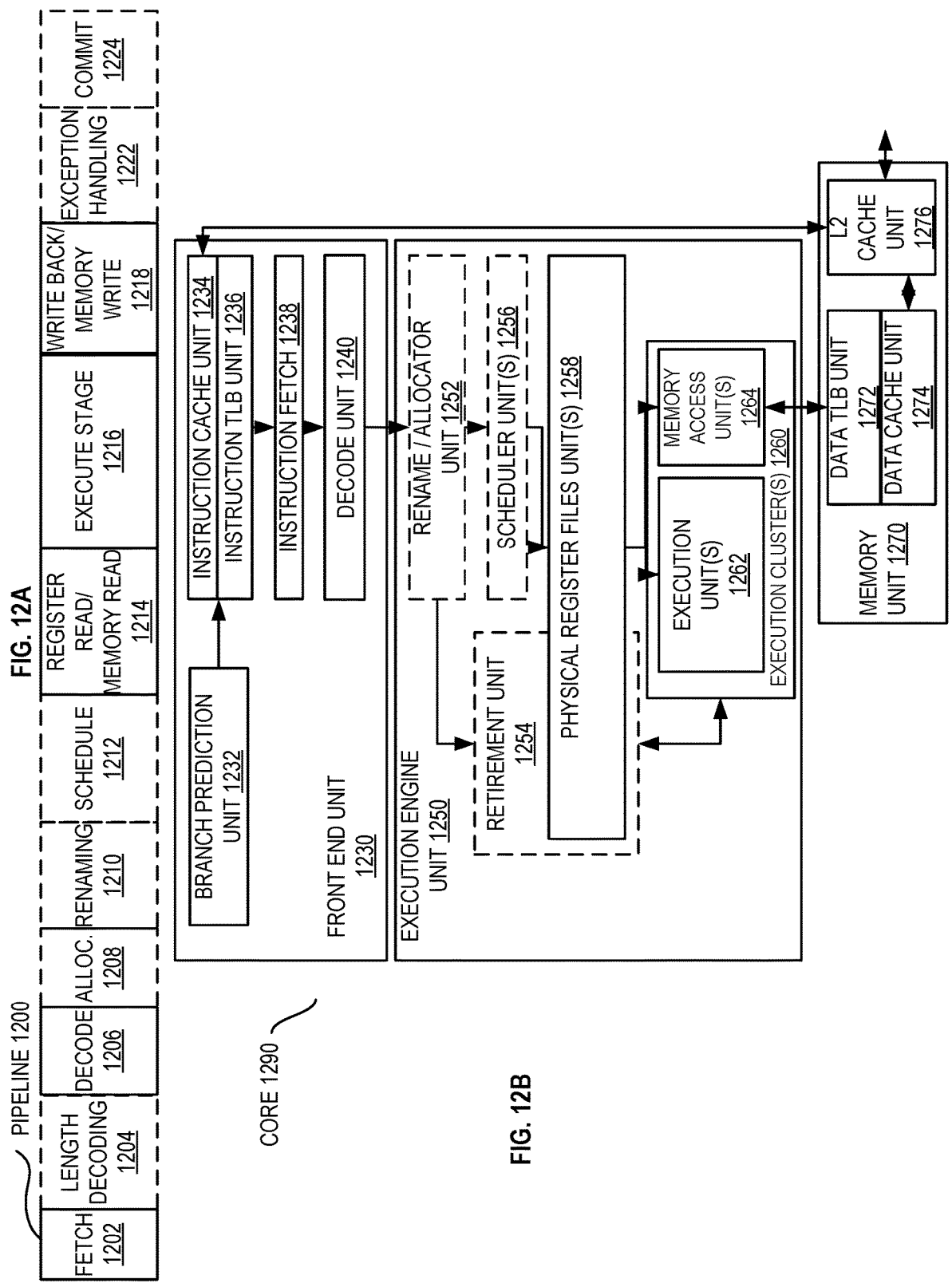

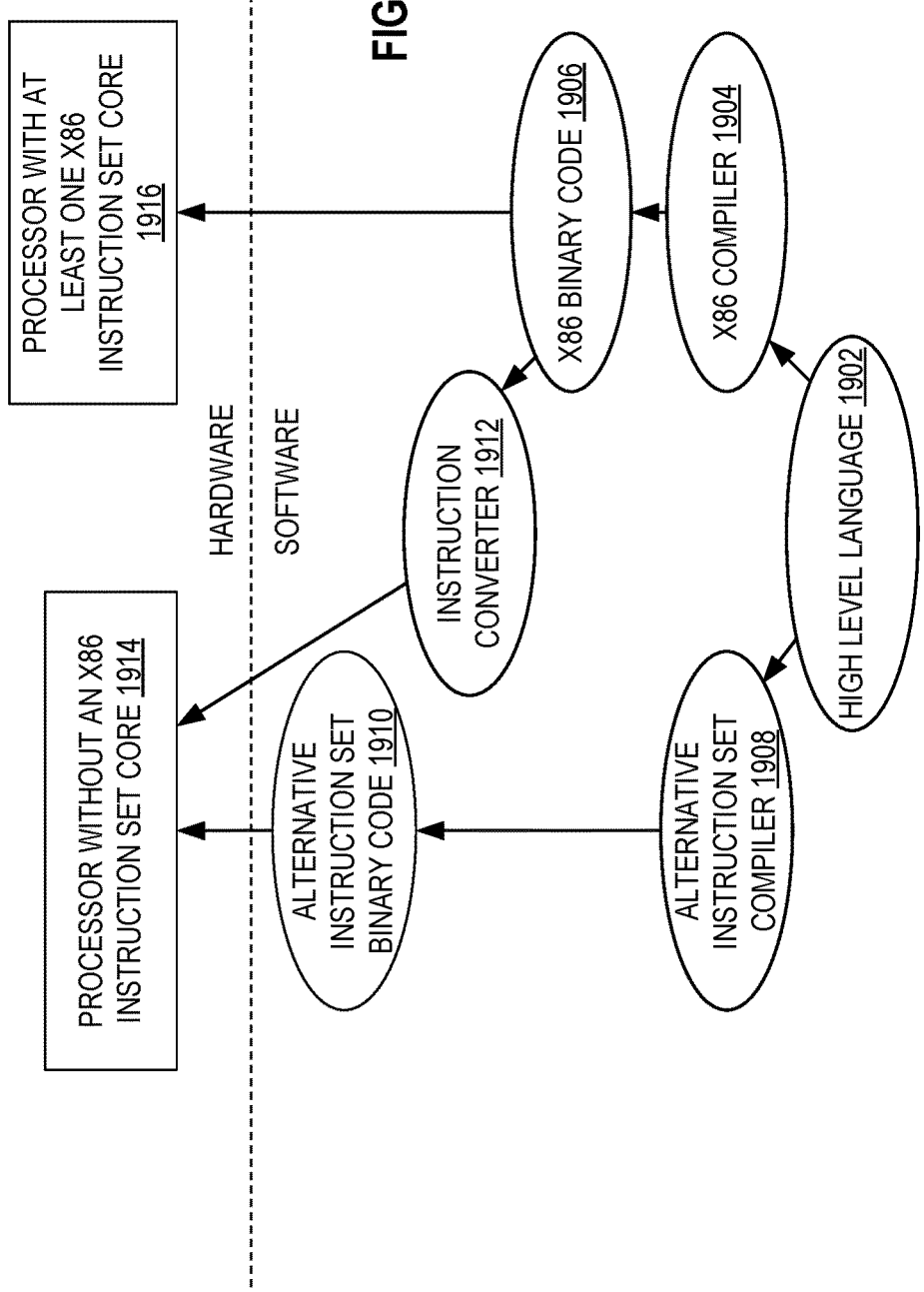

SYSTEMS, APPARATUSES, AND METHODS FOR PLATFORM SECURITY

FIELD OF INVENTION

The field of invention relates generally to computer processor architecture, and, more specifically, to platform security.

BACKGROUND

Low level hardware and firmware attacks are becoming more and more prevalent in computer systems and could lead to permanent denial of service (PDOS). PDOS is a big concern for data center systems that could lead to heavy financial losses and potentially even loss of life in cases where systems are deployed in critical infrastructures.

BRIEF DESCRIPTION OF THE DRAWINGS

The present invention is illustrated by way of example and not limitation in the figures of the accompanying drawings, in which like references indicate similar elements and in which:

FIG. 11 is a block diagram of a register architecture according to one embodiment of the invention;

FIG. 12A is a block diagram illustrating both an exemplary in-order pipeline and an exemplary register renaming, out-of-order issue/execution pipeline according to embodiments of the invention;

FIG. 12B is a block diagram illustrating both an exemplary embodiment of an in-order architecture core and an exemplary register renaming, out-of-order issue/execution architecture core to be included in a processor according to embodiments of the invention;

FIG. 19 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As noted, a computer can get compromised and lead to PDOS scenarios. When such a scenario occurs, embodiments detailed herein provide hooks to detect that a corruption has occurred and recover to a known good state. Typically, recovery is automatic, local, and fast (e.g., in a matter of seconds or minutes) without human intervention. The recovery mechanism may also be extended to the operating system (OS) and application layers by making use of remote authenticated writes to special protected partitions. Protected partitions house recovery images. In case of an attack, an active corrupt image is erased and restored with a known good recovery image from the protected partition. During runtime, embodiments detailed herein provide active filtering capabilities on buses like serial peripheral interface (SPI) that provide access to non-volatile storage to protect against known attacks that could lead to corruption of in the non-volatile (e.g., FLASH) storage of critical components like SPI flash storage, power supply firmware storage, DIMM SPD storage, Hot-Swap-Back-Plane (HSBP) storage, etc.

Figure 1:
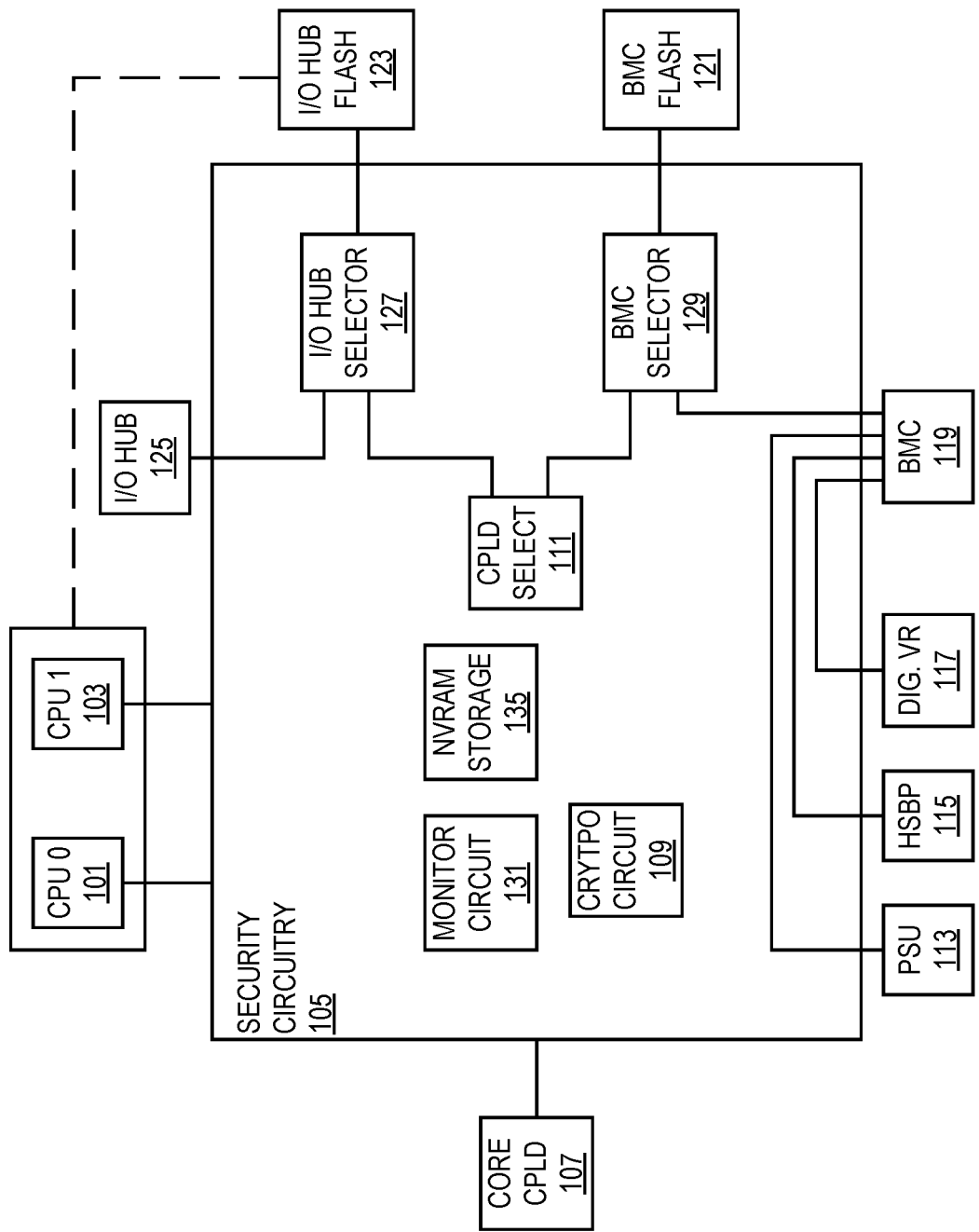
FIG. 1 illustrates an embodiment of a platform.

FIG. 1 illustrates an embodiment of a platform. In this illustration, there are two hardware processors (labeled CPU 0 101 and CPU 1 103). At least one of the CPUs (CPU 0 101 or CPU 1 103) is capable of loading and verifying an authenticated code module (ACM) in a pre-boot environment. Exemplary hardware processors include processor cores, CPUs, GPUS, APUs, etc. An ACM is platform specific code that is authenticated and executed in an isolated environment within the processor. During normal boot, the ACM is run to verify the active BIOS image. Typically, this is done by both CPUs. The ACM is used to perform secure tasks. Typically, the ACM is stored in flash such as the I/O hub flash 123 that is accessible to the CPU without involvement with the I/O hub 125 (examples of an I/O include south bridges and peripheral control hubs). The ACM in the FLASH is guarded by the security circuitry. For example, the I/O flash 123 may be accessed through the coupled security circuitry 105 via a more direct connection as illustrated. The hardware processor which is to run the ACM has access to a public key corresponding to a private key with which the platform firmware images are signed. The private key is embedded in CPU fuses or on-package non-volatile storage). The public key may be stored with the firmware or in another non-volatile memory location. In some embodiments, the ACM is responsible for the high level algorithm to perform secure boot digital signal verification, trigger and perform recovery in conjunction with the security circuitry 105.

The hardware processors (CPU 0 101 and CPU 1 103) communicate with security circuitry 105 using one or more buses. An exemplary bus is a system management bus (SMBUS). Security circuitry 105 is responsible for reset/boot sequencing, providing some monitoring and filtering capabilities, and access to I/O hub flash 123 and baseband management controller (BMC) flash 121. Note that one or more of the components illustrated as being a part of the security circuitry 105 may be outside of the circuitry footprint.

A BMC 119 monitors the physical state of the platform and communicates with external devices. The BMC 119 may go by other names including, but not limited to, management module, advanced management module, advanced systems management processor, and integrated management module. The security circuitry 105 also provides hardware acceleration support to the CPU for cryptographic functions 109 including hashing functions (e.g., SHA, MD5, etc.) and encryption (e.g., AES, etc.).

The BMC 119 accesses several other components like digital voltage regulator 117, hot swap backplane (HSBP) 115, power supply unit 113, etc. via SMBUS. These buses are routed through the security circuitry 105 allowing it to monitor and filter the SMBUS transactions to these devices during normal boot and runtime. For example, a monitor circuit 131 provides this functionality. There are several ways to monitor and filter transactions including white listing of commands that are acceptable to be sent from/to the BMC 119, or blacklisting those that are not.

A core complex programmable logic device (CPLD) 107 controls reset and timing sequences for the platform. In some embodiments, the core CPLD 107 has different reset and timing sequences for pre-boot and boot sequences. In some embodiments, core CPLD 107 requires in-field updates. The security circuitry 105 provides a secure mechanism to fetch the latest updated image from the FLASH (123 or 121) via a serial peripheral interface (SPI) boot capability.

A selector (e.g., a mux) 111 is used to select which flash 121 or 123 to talk to over SPI. I/O hub selector 127 and BMC selector 129 are used to select between the security circuitry 105 and the I/O hub 125 or BMC 119 respectively. As such, security circuitry 105 has access to the I/O hub flash 123 and the BMC flash 123 via a selector 111.

The security circuitry 105 gains access to the flash during a pre-boot mode and I/O hub 125 and the BMC 119 have access to their respective flash devices during normal boot. The SPI bus at the input of the flash devices is routed to the security circuitry 105 allowing for monitoring filtering of SPI flash transactions during normal boot when the I/O hub 125 and BMC 119 are operational and issuing transactions. For example, the security circuitry 105 may use address based filtering or maintain a list of transactions (commands) that are okay (a white list). When a malicious transaction is detected, the corresponding chip-select is de-asserted by the security circuitry 105 to prevent the transaction for proceeding. Typically, the monitor circuit 131 performs these functions.

The security circuitry 105 includes, or has access to, memory 135 which stores one or more keys and/or integrity check patterns.

In summary, the security circuitry 105 monitors and gains control over components that have non-volatile storage to house firmware pieces required for the proper functioning of these devices. Corruption in any of these components could lead to a permanent denial service. The security circuitry 105 also controls the assertion of come critical signals and hardware straps required to be driven in order to enable booting in a pre-boot environment while keeping the other devices inactive.

Figure 2:
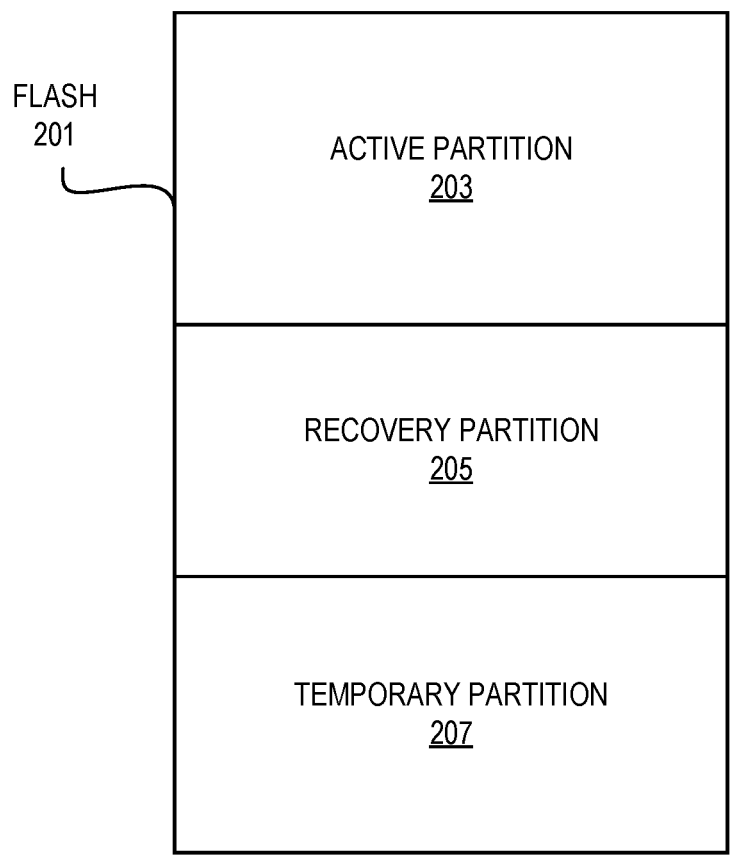
FIG. 2 illustrates an embodiment of the flash devices of FIG. 1.

FIG. 2 illustrates an embodiment of the flash devices of FIG. 1. In particular, the flash 201 is partitioned in three sections: active partition 203, recovery partition 205, and temporary partition 207. The active partition 203 is used during normal boot. The recovery partition 205 stores a "golden" image (one that is known to be okay). This partition is read during the normal system boot and is guarded by the security circuitry 105. If the active partition is corrupted, the golden image is used to restore the active partition 203 while wiping it clean. The temporary partition 207 holds a candidate copy for an update of the golden image. This partition is written during normal boot, but is promoted during pre-boot by overwriting the golden recovery partition upon successful verification of the candidate.

Figure 3:
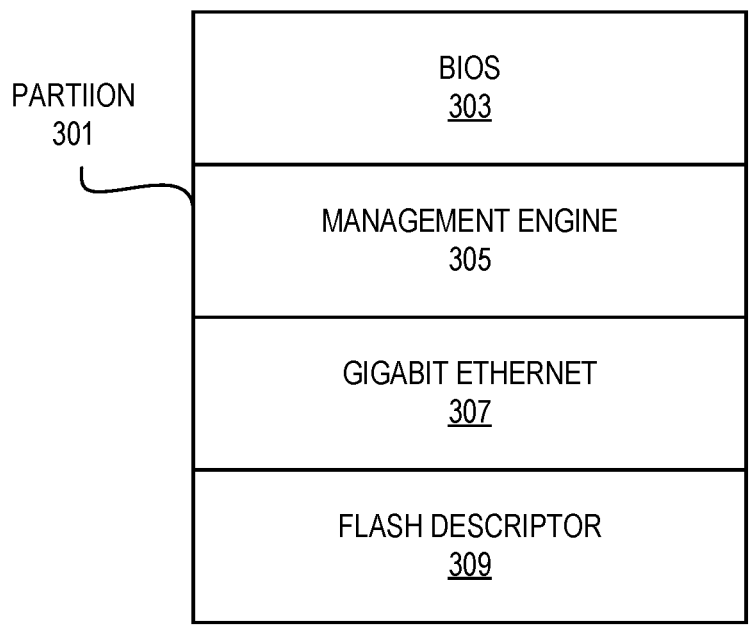
FIG. 3 illustrates an embodiment of a partition of the flash devices of FIG. 2.

FIG. 3 illustrates an embodiment of a partition of the flash devices of FIG. 2. For example, an active partition 203 of the I/O hub flash 123. Several components are shown such as a basic input/output system (BIOS) 303, management engine firmware 305, gigabit Ethernet firmware 307, and a flash descriptor 309 (indicating where the boundaries of these component are) are included in a partition. Of course, more or less components may be included in a partition. One or more of the components includes a public signature or key (or the flash descriptor 309 stores it).

Figure 4:
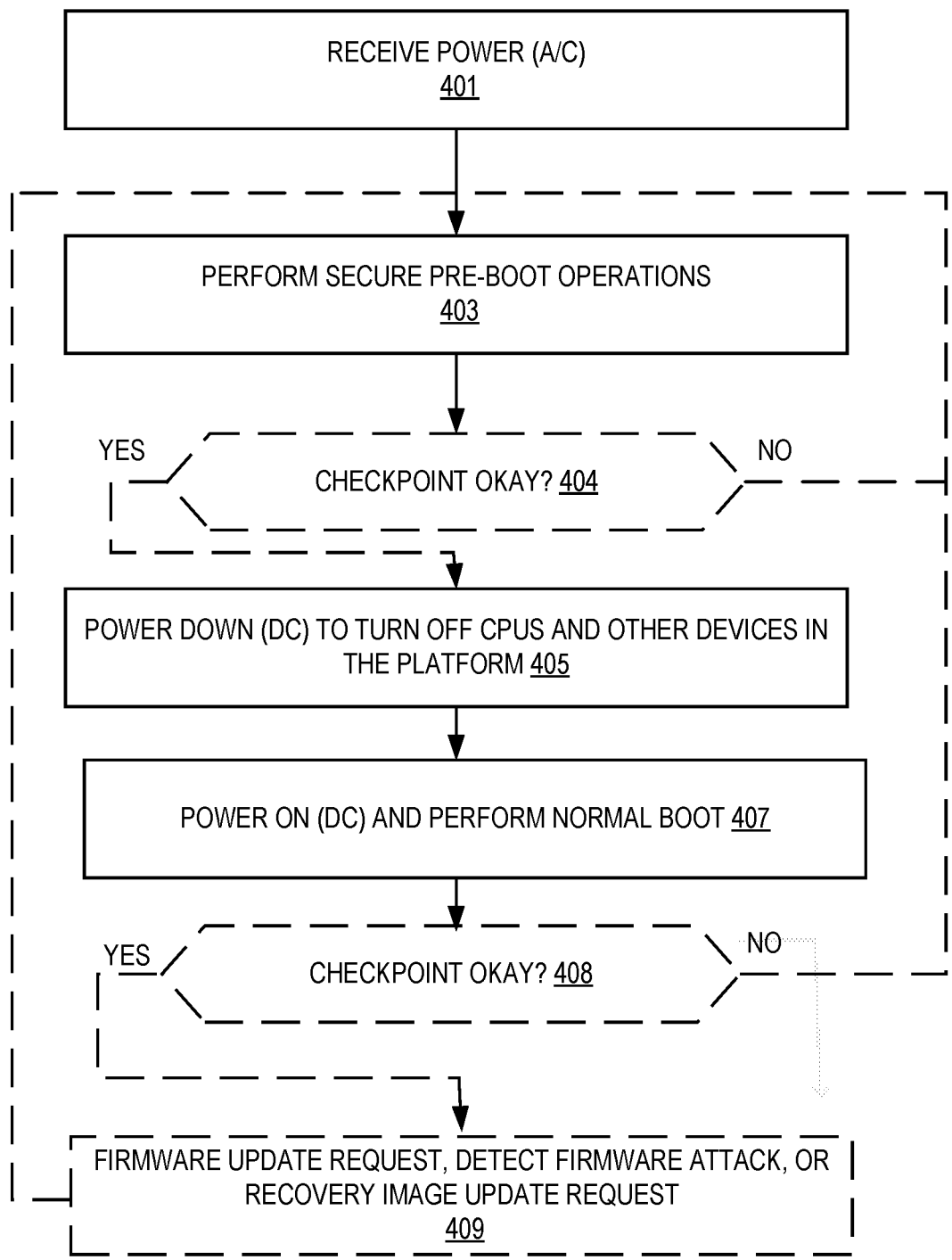
FIG. 4 illustrates an embodiment of a method of using security circuitry in a platform.

FIG. 4 illustrates an embodiment of a method of using security circuitry in a platform. At 401, the platform receives alternating current (AC) power. For example, it is plugged in.

A secure pre-boot is performed at 403. The pre-boot is a trusted mode of operation in which firmware verification, update and recovery operations occur. In pre-boot only one CPU is powered up and other external devices (e.g., BMC 119 and/or I/O hub 125) are kept at complete rest. Typically, the core CPLD 107 with the security circuitry 105 drives some of the critical signals that would otherwise be driven by the I/O hub to trigger the platform power up sequence.

In some embodiments, an explicit boot progress monitoring is performed. For example, watchdog timers implemented within the security circuitry 105 are used to monitor boot process. Different sections of the boot firmware rendezvous with the security circuitry 105 at different boot stages to record successfully booting to the particular stage before the watchdog timer expires. This is referred to herein as a checkpoint. A checkpoint is made at 404 in some embodiments. If the checkpoint fails, then secure pre-boot operations are performed at 403. If the checkpoint is successful, then pre-boot is complete.

After the pre-boot is complete (e.g., secure boot or recovery is complete), security circuitry removes the direct current (DC) power to the CPU at 405. As such, the CPU, BMC 119, and I/O hub 125 are all without a context. In some embodiments, the security circuitry 105 is up during this transition.

After DC power down, security circuitry restores the DC power and the CPU(s), I/O hub 125, and BMC 119 are enabled and booted as normal at 407. In some embodiments, a checkpoint is made at 408. If the checkpoint fails, then secure pre-boot operations are performed at 403. If the checkpoint is successful, then normal boot has completed.

In some embodiments, a firmware attack, firmware update request, or a recovery image update request is detected at

409. For example, the active partition of the I/O hub flash 123 becomes corrupted. This causes a panic condition to be raised and a reboot into the pre-boot stage. If a recovery needs to be made, the security circuitry 105 is engaged to either move the gold image to the active partition (if proper to do so based on a security check), remote toggle a reset, or use a fail-safe radio frequency identification (RFID) device to receive a command.

Figure 5:
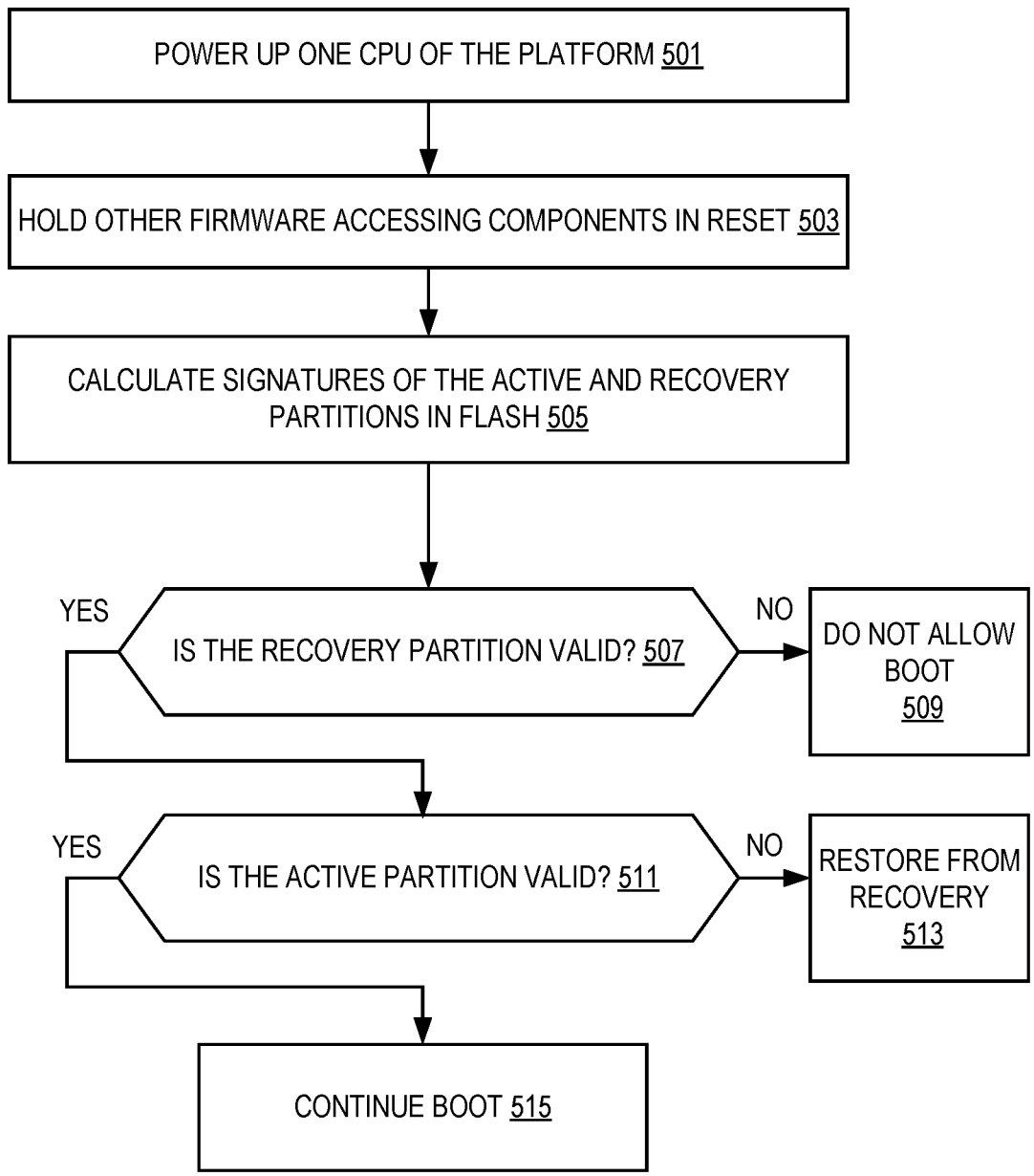
FIG. 5 illustrates an embodiment of a method of using security circuitry in a platform.

FIG. 5 illustrates an embodiment of a method of using security circuitry in a platform. In particular, this method is the pre-boot mode executed by security circuitry. At 501, one of the CPUs of the platform is powered up by the security circuitry 105. Other platform components that access firmware are kept in reset (e.g., BMC 119 and I/O hub 125) are kept in reset at 503. As stated previously, this is typically done via the security circuitry 105 with the core CPLD 107. In some embodiments, the core CPLD 107 functions are merged into the security circuitry 105.

At 505, the signatures of the firmware in the active partition 203 and recovery partition 205 of the flash 123 and 121 are calculated. The ACM and security circuitry 105 work in conjunction to compute a hash for key verification in most embodiments. The public and private keys discussed above are used for the calculations.

A determination of if the flash recovery partition 205 is valid is made at 507. If yes, the recovery partition 205 is used to restore the active partition 203. If not, then the boot process is halted at 509

A determination of if the active partitions 203 are valid is made at 511. For example, did the keys produce the correct result for the public/private hash calculations. For example, the security circuitry 105 may check to see if there are any pending updates to any of the other firmware components (BMC 119, I/O hub 125, PSU 113, HSBP 115, digital VR 117, etc.). The update candidates (in the temporary partition 207) are verified in some embodiments. In some embodiments, the golden image must also be verified before an update can occur.

When the active partition is valid, a restoration from a recovery partition is made at 513. A recovery policy (such as a number of times recovery should be attempted before declaring that the system is not recoverable due to a potentially spurious reason) is used in some embodiments. Further, boot failure (i.e. failed recovery attempt) is detected either implicitly via digital signature verification or explicitly via boot progress monitoring.

Unfortunately, external intervention is sometimes needed. In some embodiments, a sideband mechanism provides for communication between a platform (e.g., server systems installed in a datacenter) and an external device (e.g., a remote manageability server/console through which the server nodes in the datacenter can be queried or controlled).

Figure 6:
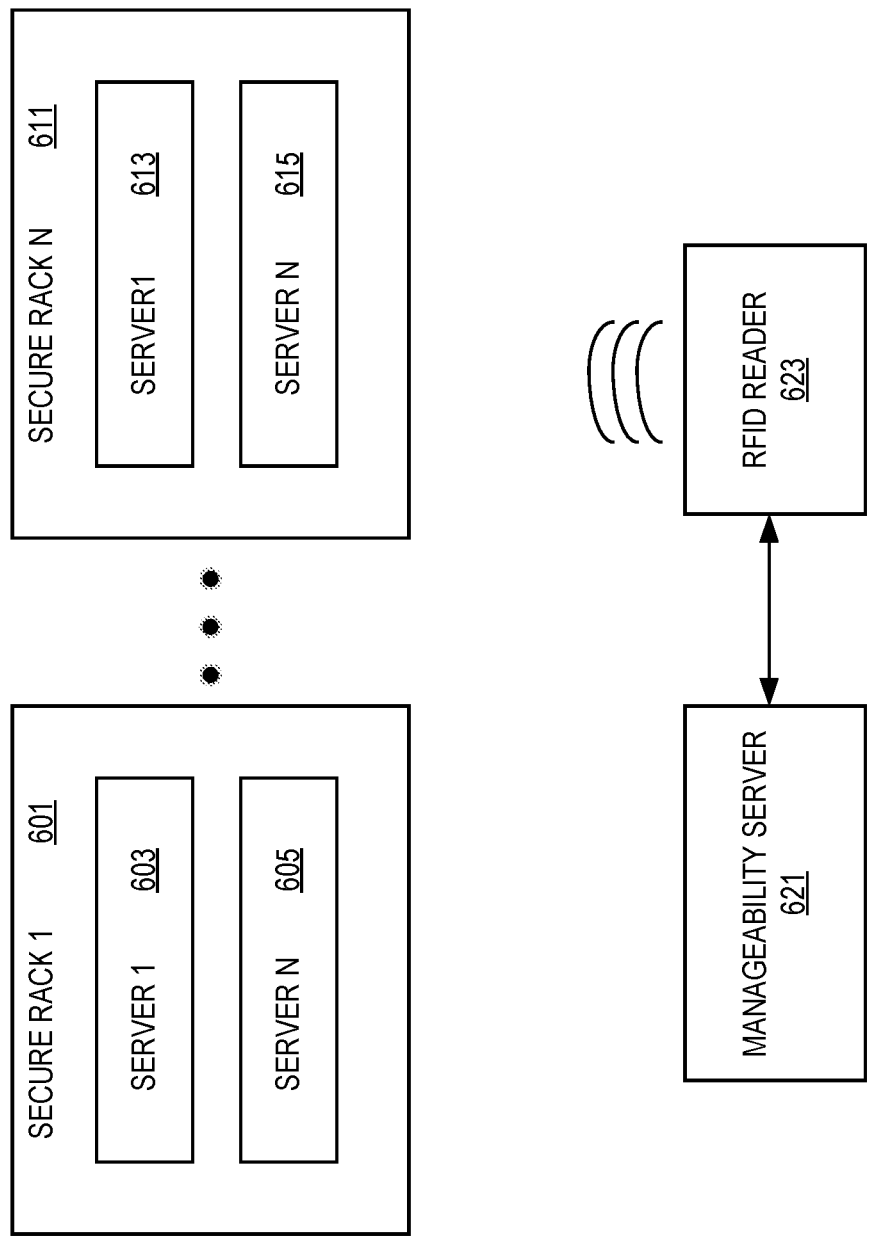
FIG. 6 illustrates an embodiment of a system for use in sideband communications.

FIG. 6 illustrates an embodiment of a system for use in sideband communications. In this exemplary embodiment, one or more server racks 601, 611 house a plurality of servers 603, 605, 613, and 615. At least one of these servers 603, 605, 613, and 615 includes hardware capable of sideband communication (e.g., a RFID tag).

A manageability server 621 communicates with an RFID reader 623 to communicate with the RFID tag of a server. In some embodiments, a network of RFID scanners and repeaters is installed within a datacenter. The RFID read ranges are typically designed to be a few centimeters and is confined within the walls of the datacenter. The manageability server 621 executes applications that have the intelligence to control and query the servers 603, 605, 613, and 615.

Typically, this approach is very light in terms of a software stack requirements from the server standpoint to establish this communication. This should translate into higher security and reliability of the communications due to less components being involved in the trust boundary of the solution and reduced complexity.

As a result, RFID sideband approach may be used to issue critical commands to a server 603, 605, 613, and 615 in case it fails to make progress without any external intervention. Similarly, the RFID sideband approach may also be used to retrieve error logs and other critical information from the server 603, 605, 613, and 615 in order to determine the state of the server 603, 605, 613, and 615. Thus, it provides the attributes necessary to trigger/force a recovery event of a server 603, 605, 613, and 615 fails to execute an automated recovery as detailed above. Unlike existing BMC based side band methods, this typically uses just auxiliary power to be applied (no core execution required).

Figure 7:
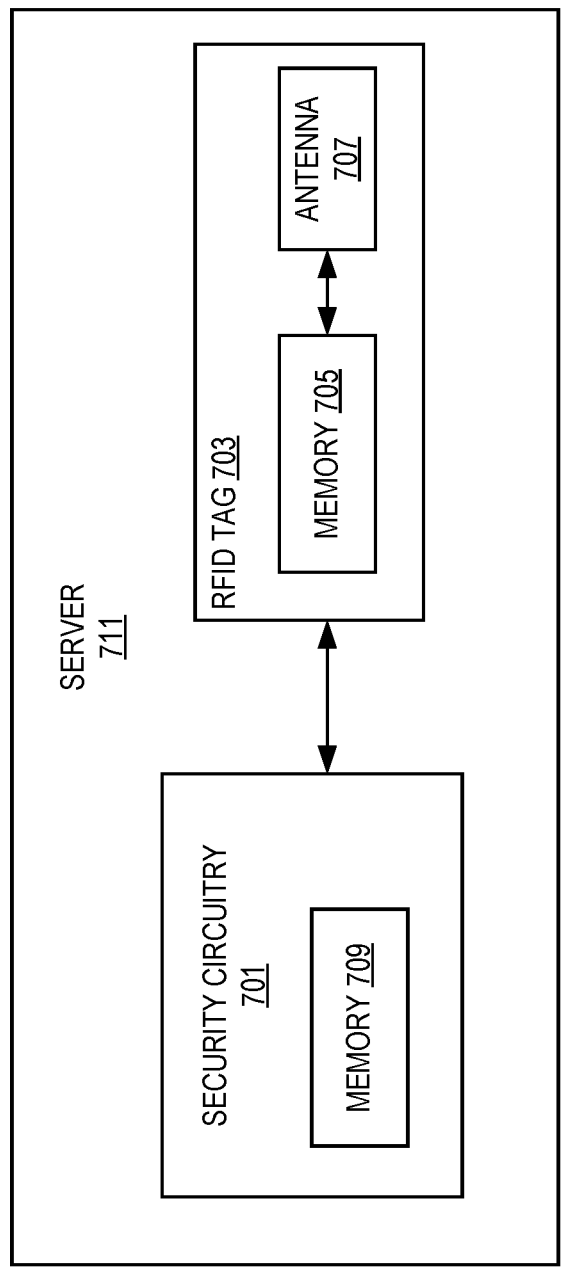
FIG. 7 illustrates an embodiment of a server of a sideband system.

FIG. 7 illustrates an embodiment of a server of a sideband system. As shown, security circuitry 701 (such as security circuitry 105) over the server 711 communicates with an RFID tag 703 (typically, over an I2C interface). This tag includes an antenna 707 to communicate with external devices and storage/memory 705 to store commands. Typically, the RFID tag 703 is a passive device that acts as a mailbox for the security circuitry 701.

This allows for a sideband remote manageability channel via RF. The RFID tag 703 receives encrypted commands with anti-replay protection via an RF input (e.g., 860-960 MHz band). The memory 705 is typically accessible via two interfaces—a wired interface and a wireless RF interface, thus allowing the RFID tag to be used as a mailbox to establish communication between a server and manageability server.

The security circuitry 701 polls the encrypted commands from the memory 705 and decrypts them and takes actions accordingly. Exemplary commands are: enter pre-boot, verify images, trigger recovery, etc. The received commands may be in a simple format such as a "0" is pre-boot, "1" is verify images, etc. The memory 705 (such as non-volatile random access memory (NVRAM)) may also be used to store a log of errors such that this path also enables the datacenter administrator to securely receive messages from the platform in order to monitor health/status and progress of the platform.

The security circuitry 701 may be the circuitry detailed earlier, or may be other circuitry within a server. Additionally, in some embodiments, software is used instead of dedicated circuitry. The security circuitry 701 includes, or has access to, memory 709 which stores one or more keys and/or integrity check patterns. The security circuitry 701 has the encryption/decryption capabilities to encrypt and decrypt the control/status messages exchanged. AES-CBC-128 encryption is used to establish an encrypted communication link that is protected against anti-replay attacks.

In some embodiments, packets of communication message exchanges between the server and a manageability console are encrypted with anti-replay protection. In some embodiments, AES-CBC-128 encryption is used. A symmetric AES key is pre-provisioned within the security circuitry 701 in the server system (e.g., stored in non-volatile memory 609) as well as within the manageability console.

Figure 8:
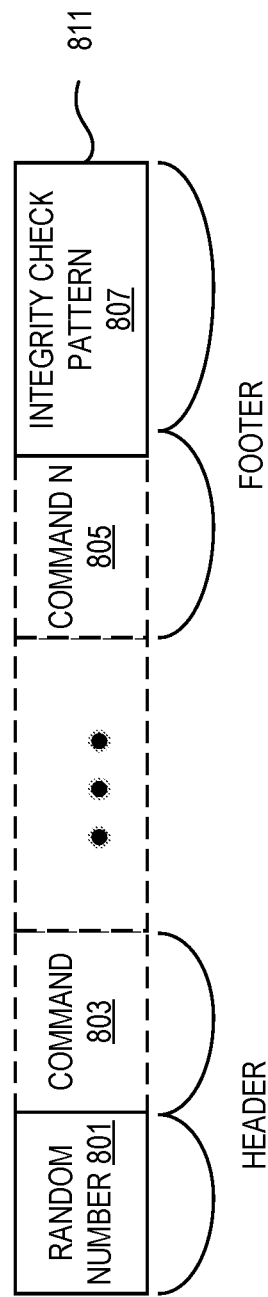
FIG. 8 illustrates an embodiment of a message.

FIG. 8 illustrates an embodiment of a message. The message 811 comprises a plurality of packets including a random number 1001 (e.g., a 64-bit random number), an integrity check pattern 807 (e.g., a 64-bit integrity check pattern), and at least one command 803-805 (e.g., 64-bit command). Typically, the packets are in a 128-bit alignment, which is the AES data size granularity.

In some embodiments, the header of the message 811 contains the random number 801 and a command; and the footer of the message 811 contains integrity check pattern 807 and 64 bits of command. When more than 128 bits of command packets are to be used, these additional command packets are included between the header and the footer.

As noted, in some embodiments, AES-CBC encryption is used. As a result, the first 128 bits of the AES encryption affects the next 128-bit pattern. The presence of the random number 801 in the message 811 creates a random string of packets in each message. Upon decryption, a fixed integrity check pattern (stored in, or accessible to, the receiver) is used to check the validity of the message. As such, a valid message upon decryption has an integrity check pattern that matches the integrating check pattern that is stored internally within the security circuitry 701 on the server system as well as the manageability server 621.

Different meanings are associated with single bits or encodings of multiple bits within the command packets of a message to create simple commands. Exemplary commands include, but are not limited to: reboot, shut down, recover platform firmware, enter a pre-boot boot mode, provide error log, etc.

An encrypted string written into a defined location within the RFID tag 703 (e.g., memory 705) and therefore accessible to security circuitry 701 of the target server. In some embodiments, each RFID tag 703 has a unique, or pseudo-unique, identifier that allows independent communication with each server via the unique its identifier.

Figure 9:
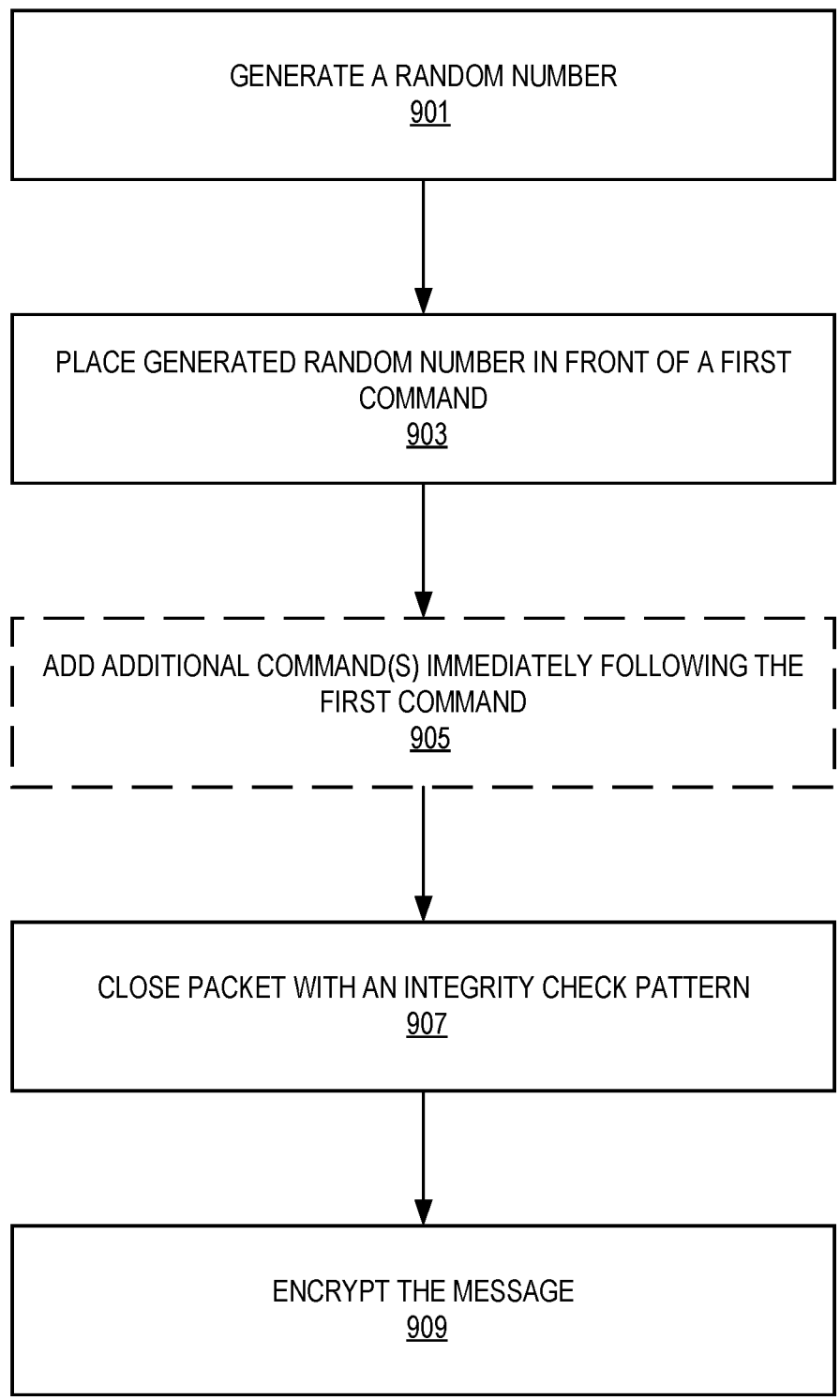
FIG. 9 illustrates an embodiment of a method performed by software executed on a server to generate a message in response.

Commands are typically built and initiated by the manageability server 621, an end-user of the manageability server 621, a server that wants to communicate with the manageability server 621, and/or an end-user of the server that wants to communicate with the manageability server 621. FIG. 9 illustrates an embodiment of a method performed by software executed on a server to generate a message in response. At 901, a random number is generated.

The random number is placed in front of any command packets of the message at 903. In other words, the random number is the first thing in the message and it is followed by at least one command.

At 905, additional commands (other than the initial command that follows the generated random number) are added to the message.

The packet is closed with an integrity check pattern that is identical to that of the recipient server at 907. The fully assembled message is then encrypted at 909. For example, a message with a random number, followed by 4 commands, followed by an integrity check patter is encrypted using AES-CBC-128 encryption.

Figure 10:
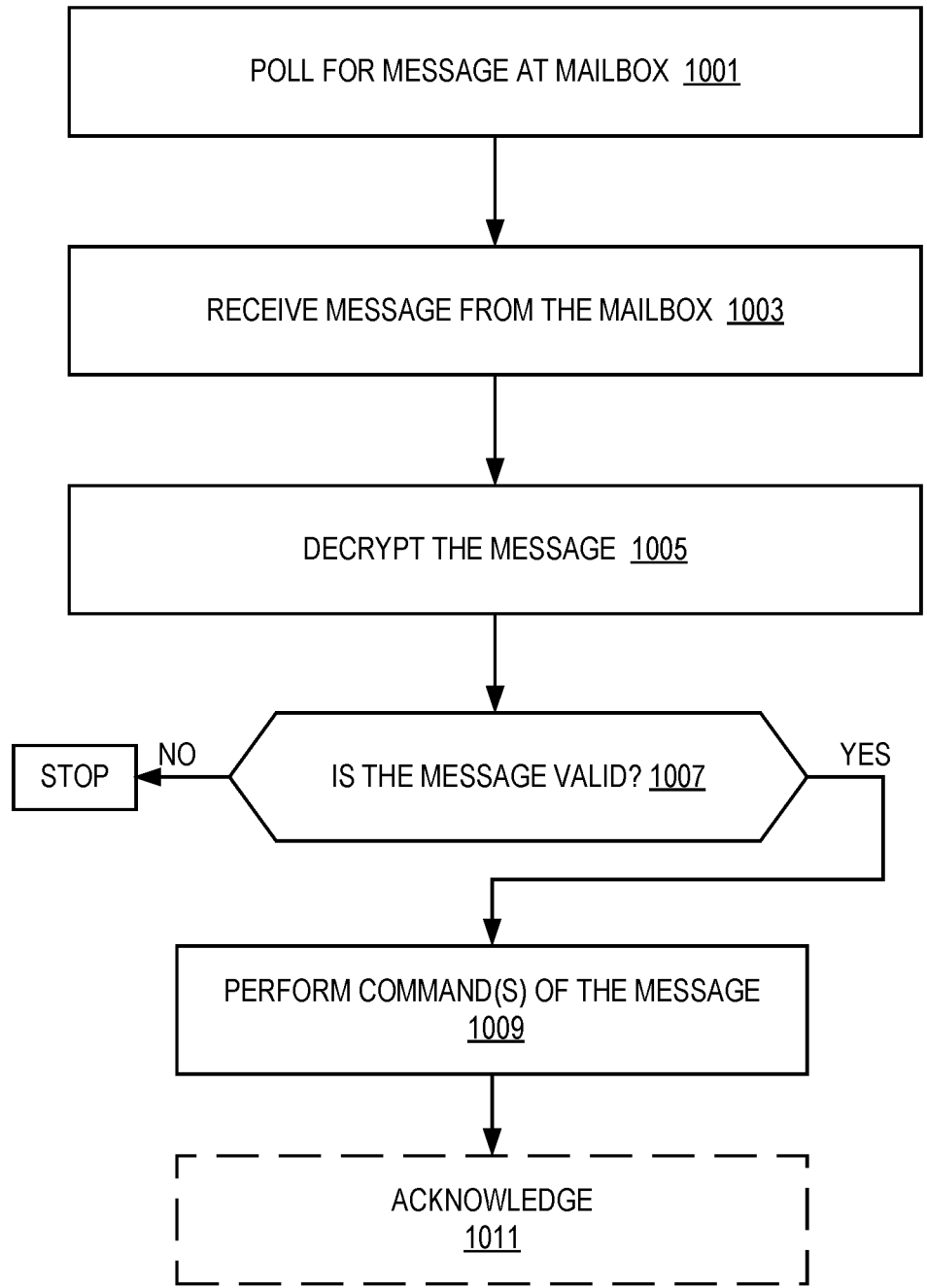
FIG. 10 illustrates an embodiment of a method performed by a server having an RFID tag to receive or send messages.

FIG. 10 illustrates an embodiment of a method performed by a server having an RFID tag to receive or send messages. At 1001, a security circuit 701 on the server keeps polls for a message in its RFID tag mailbox.

A message is retrieved from the mailbox at 1003 and decrypted using a stored key at 1005. A determination of if the message is valid is made at 1007. For example, the integrity check pattern from the decrypted message is matched with the integrity check pattern stored internally. When the message is not valid, then the message is ignored or the server alerts either an end-user or the manageability server of the invalid message.

When the message is valid, the security circuit 701 decodes the commands embedded within the packets and takes appropriate action at 1009.

In some embodiments, commands require an acknowledgement at 1011. The server typically generates an acknowledgement using one or more aspects of the method of FIG. 9. For example, commands such as "provide error log" requires an acknowledgement pattern. The command of the acknowledgement message is replaced with the error log. Typically, the length and meaning of bits within the error log are defined and known to both ends of the communication channel.

In some embodiments, when the security circuit 701 is capable of generating a random number, it embeds a new random number in the acknowledgement packet. In some embodiments, when the security circuit 701 cannot generate a random number, it performs a fixed arithmetic operation on the random number from the received message and embeds the resulting number in the acknowledgement packet. The end of the message is tagged with the integrity check pattern of the server. The message is then encrypted message and written back into the mailbox for later retrieval (e.g., by RFID or other means).

The receiving server may perform one more aspects of the above as needed to process the message such as polling, decrypting, determining validity, etc.

Additional embodiments include, but are not limited to an apparatus having a hardware processor and security circuitry to perform pre-boot operations including signature verification of a portion of firmware in a firmware storage hardware and initiating recovery upon a signature verification failure. Additionally, one or more of the following applies to an embodiment: the hardware processor is one of a plurality of multicore hardware processors. In one or more embodiments; the firmware is to isolate the firmware storage hardware from an input/output hub during the pre-boot operations; the firmware is to isolate the firmware storage hardware from a baseboard management controller during the pre-boot operations; the hardware processor comprises circuitry to verify and execute an authenticated code module stored in the firmware storage hardware during the pre-boot operations; the security circuitry includes cryptographic circuitry to perform the signature verification; a complex programmable logic device (CPLD) is used to control reset and timing sequences during the pre-boot operations; the CPLD is within the security circuitry; the security circuitry to monitor and filter bus transactions during boot and runtime; the security circuitry to monitor and filter bus transactions during boot and runtime; the security circuitry to monitor and filter bus transactions during boot and runtime; and/or the security circuitry to monitor and filter bus transactions during boot and runtime.

Additional embodiments include, but are not limited to a method comprising receiving alternating current (AC) power, performing secure pre-boot operations using at least a security circuit, powering down direct current (DC) power to any hardware processor in operation during secure pre-boot, and powering on DC power to hardware processors and performing a normal boot. Additionally, one or more of the following applies to an embodiment of the method: the secure pre-boot operations comprise powering up one hardware processor in a plurality of hardware processors and holding components that access firmware in reset, holding other platform components that access firmware in reset, calculating signatures of active and recovery partitions in flash using both a public and a private key, determining that the active partition is invalid, and restoring the active partition with the recovery partition; the private key is stored in fuses of the one hardware processor, the private key is stored in non-volatile memory accessible to the one hardware processor, the method includes detecting a firmware attack and performing secure pre-boot operations, the firmware attack is an attack on an active partition of firmware stored in an input/output hub flash, the active partition stores a basic input and output system (BIOS), the secure pre-boot operations are performed using the security circuit and an authenticated code module executing on a hardware processor.

Additional embodiments include, but are not limited to an system having a hardware processor, firmware storage hardware to store firmware for the system, and security circuitry to perform pre-boot operations including signature verification of a portion of firmware in the firmware storage hardware and initiating recovery upon a signature verification failure. Additionally, one or more of the following applies to an embodiment: the hardware processor is one of a plurality of multicore hardware processors. In one or more embodiments; the firmware is to isolate the firmware storage hardware from an input/output hub during the pre-boot operations; the firmware is to isolate the firmware storage hardware from a baseboard management controller during the pre-boot operations; the hardware processor comprises circuitry to verify and execute an authenticated code module stored in the firmware storage hardware during the pre-boot operations; the security circuitry includes cryptographic circuitry to perform the signature verification; a complex programmable logic device (CPLD) is used to control reset and timing sequences during the pre-boot operations; the CPLD is within the security circuitry; the security circuitry to monitor and filter bus transactions during boot and runtime; the security circuitry to monitor and filter bus transactions during boot and runtime; the security circuitry to monitor and filter bus transactions during boot and runtime; and/or the security circuitry to monitor and filter bus transactions during boot and runtime.

The figures detailed below provide exemplary architectures and systems to implement embodiments of the above. In some embodiments, one or more hardware components and/or instructions described above are emulated as detailed below, or implemented as software modules.

Exemplary Register Architecture

FIG. 11 is a block diagram of a register architecture 1100 according to one embodiment of the invention. In the embodiment illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 1115—in the embodiment illustrated, there are 8 write mask registers (k0 through k7), each 64 bits in size. In an alternate embodiment, the write mask registers 1115 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 12A is a block diagram illustrating both an exemplary in-order pipeline and an exemplary register renaming, out-of-order issue/execution pipeline according to embodiments of the invention. FIG. 12B is a block diagram illustrating both an exemplary embodiment of an in-order architecture core and an exemplary register renaming, out-of-order issue/execution architecture core to be included in a processor according to embodiments of the invention. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 13B:
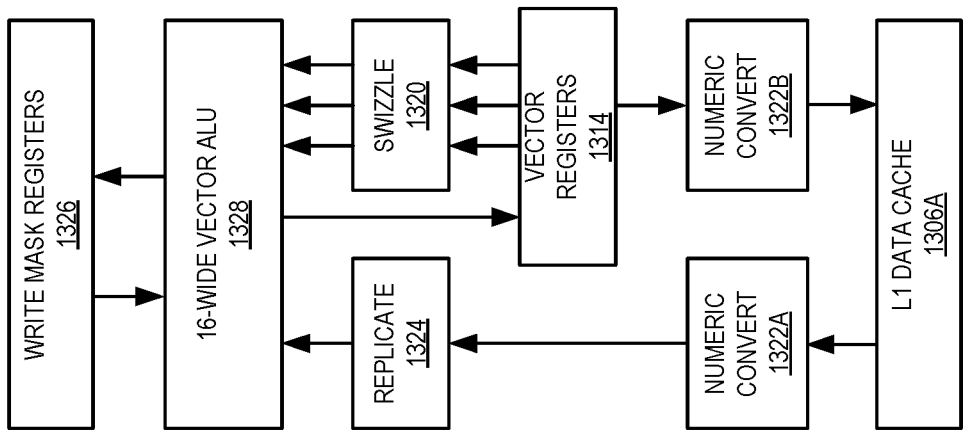
FIGS. 13A-B illustrate a block diagram of a more specific exemplary in-order core architecture, which core would be one of several logic blocks (including other cores of the same type and/or different types) in a chip.
Figure 13A:
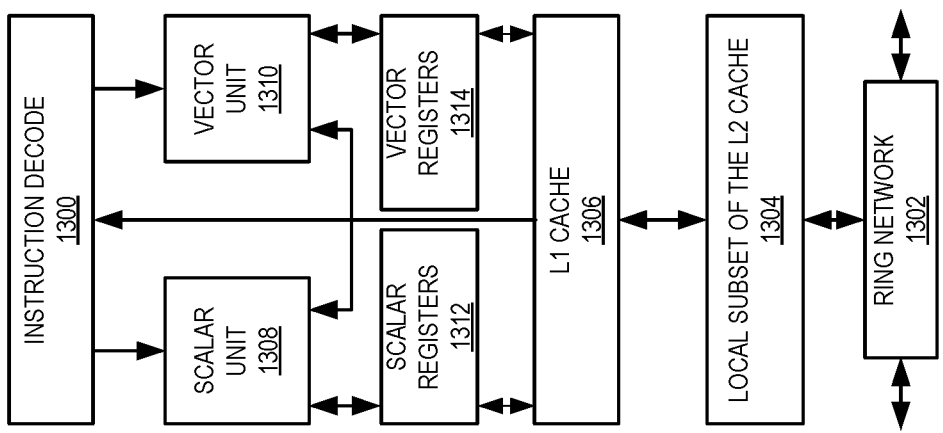

FIGS. 13A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to embodiments of the invention. In one embodiment, an instruction decoder 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the invention may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to embodiments of the invention. FIG. 13B includes an L1 data cache 1306A part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
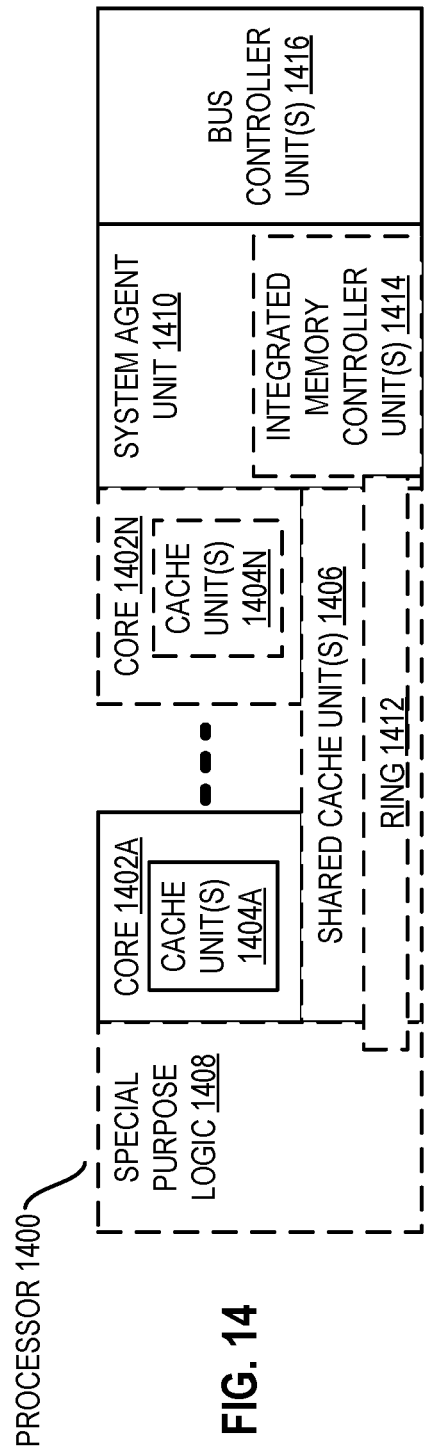
FIG. 14 is a block diagram of a processor 1400 that may have more than one core, may have an integrated memory controller, and may have integrated graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache 1404A-N within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408, the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402-A-N.

In some embodiments, one or more of the cores 1402A-N are capable of multithreading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Exemplary Computer Architectures

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
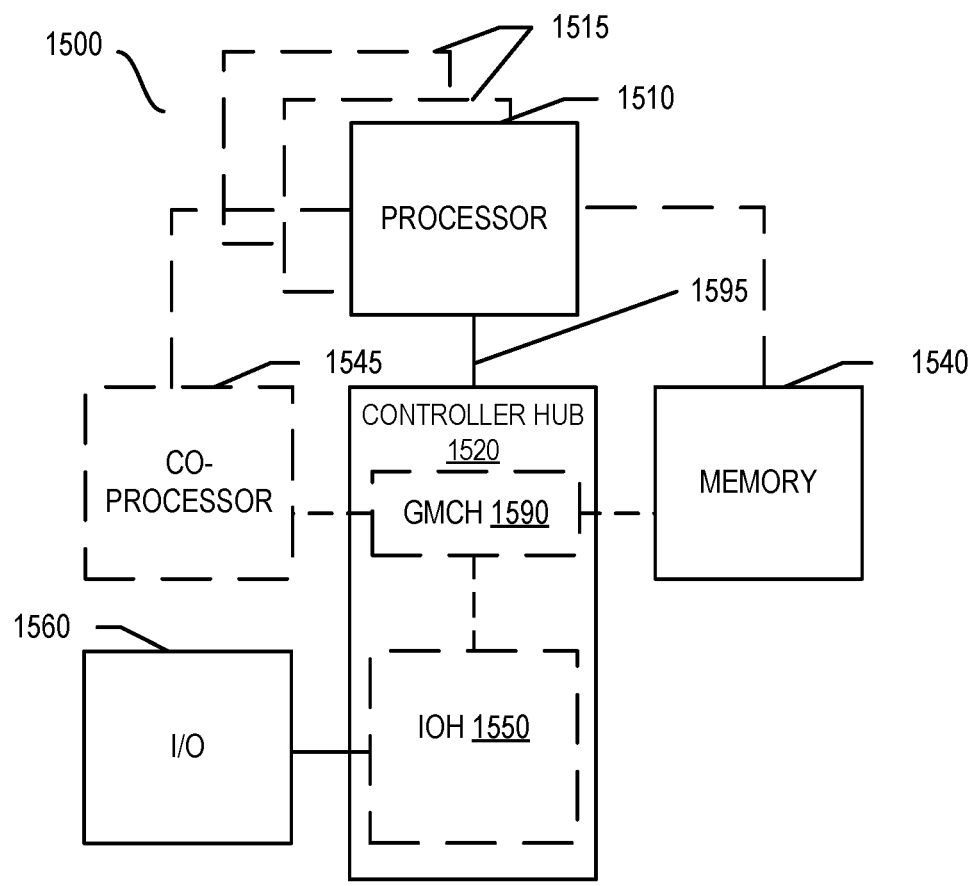
FIGS. 15-18 are block diagrams of exemplary computer architectures.

Referring now to FIG. 15, shown is a block diagram of a system 1500 in accordance with one embodiment of the present invention. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 is couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as QuickPath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
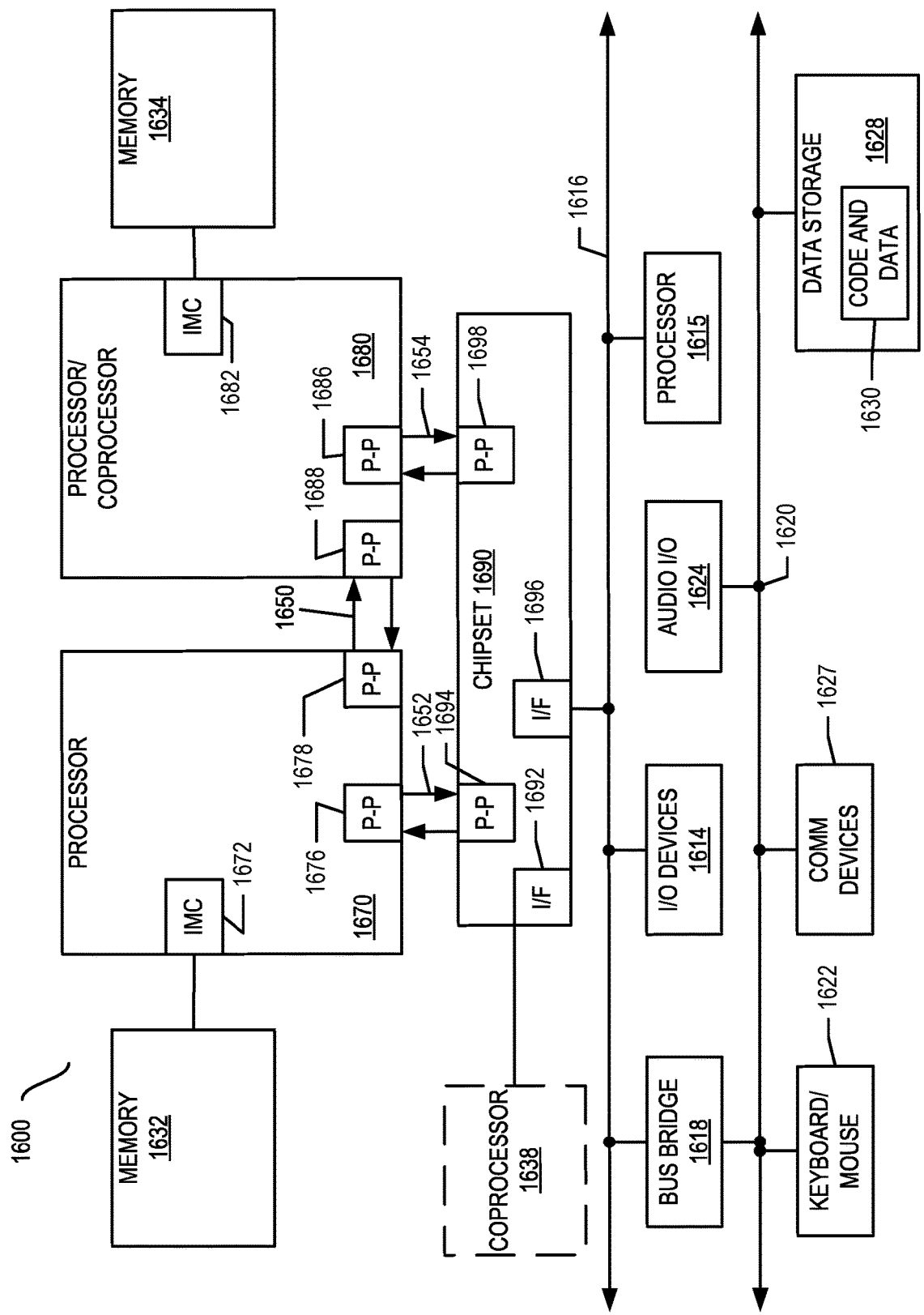

Referring now to FIG. 16, shown is a block diagram of a first more specific exemplary system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the invention, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1692. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
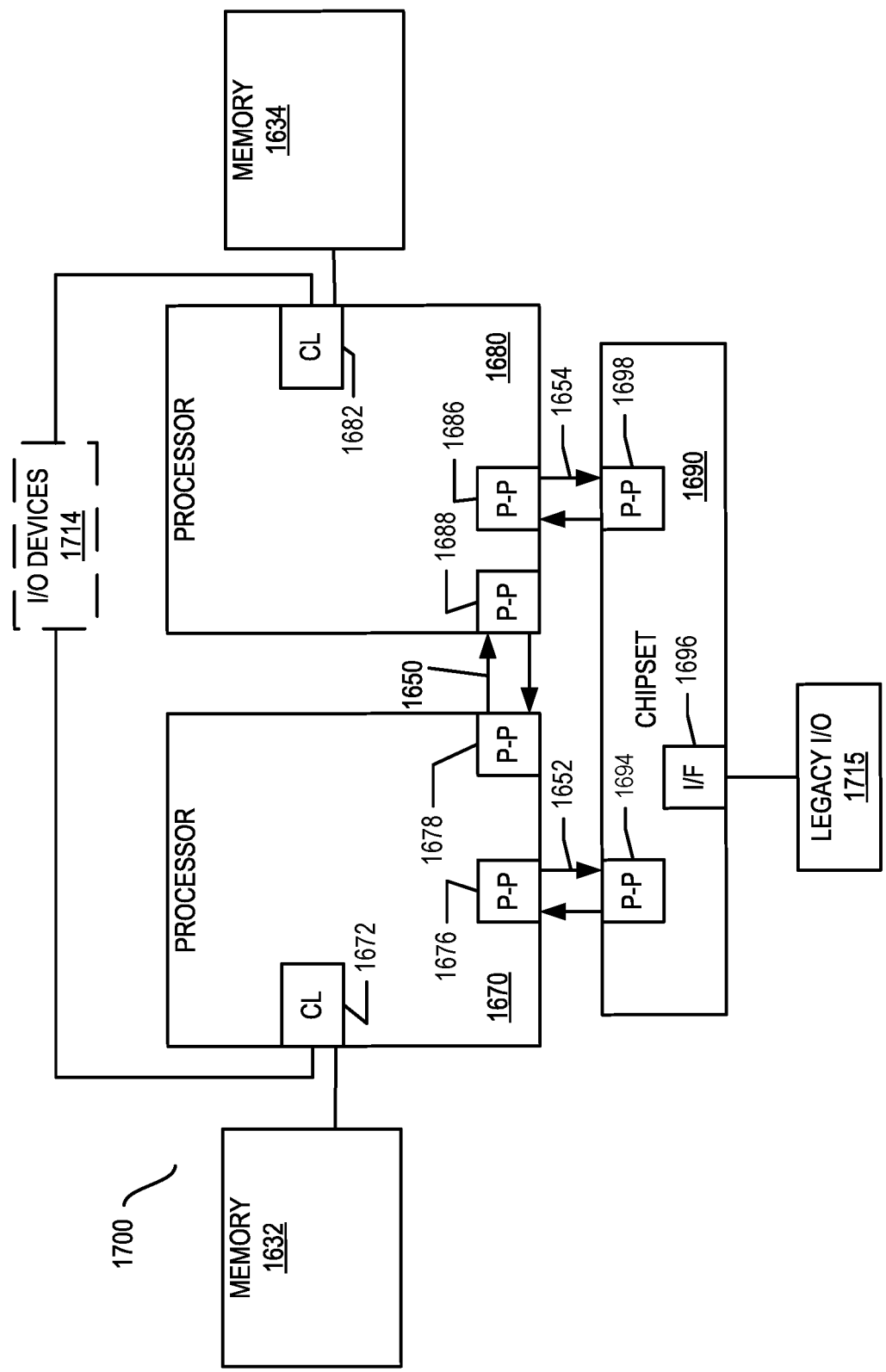

Referring now to FIG. 17, shown is a block diagram of a second more specific exemplary system 1700 in accordance with an embodiment of the present invention. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
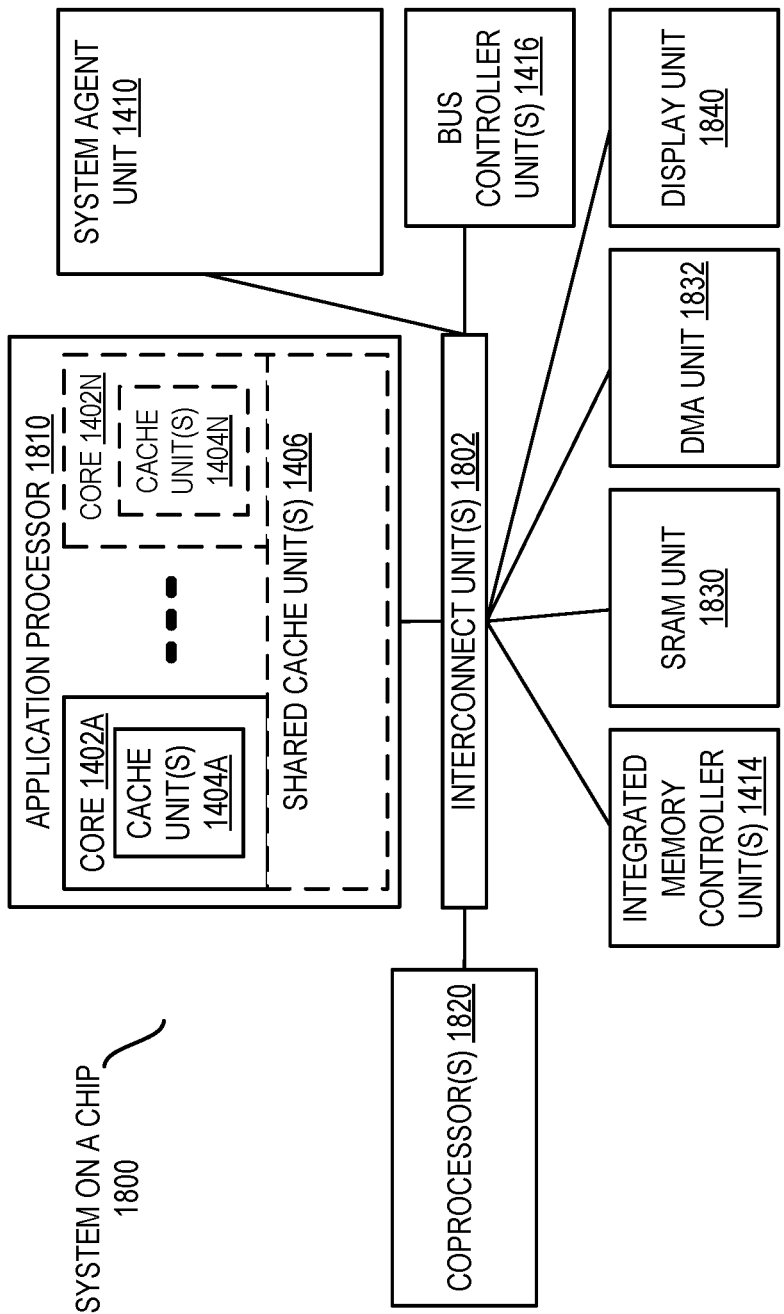

Referring now to FIG. 18, shown is a block diagram of a SoC 1800 in accordance with an embodiment of the present invention. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N, cache 1404A-N, and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 19 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

What is claimed is:

1. An apparatus comprising:
a hardware processor of a plurality of hardware processors; and security circuitry to:
perform pre-boot operations including signature verification of an active portion of firmware and a recovery portion of firmware in a firmware storage hardware,
not allow boot upon a signature verification failure of the recovery portion of firmware,
initiate recovery upon a signature verification failure of the active portion of firmware and a signature verification pass of the recovery portion of firmware, and
allow boot when the signature verification of the active portion of firmware and the recovery portion of firmware passes.

2. The apparatus of claim 1, wherein the firmware is to isolate the firmware storage hardware from an input/output hub during the pre-boot operations.

3. The apparatus of claim 1, wherein the firmware is to isolate the firmware storage hardware from a baseboard management controller during the pre-boot operations.

4. The apparatus of claim 1, wherein the hardware processor comprises:
circuitry to verify and execute an authenticated code module stored in the firmware storage hardware during the pre-boot operations.

5. The apparatus of claim 1, wherein the security circuitry includes cryptographic circuitry to perform the signature verification.

6. The apparatus of claim 1, further comprising:
a complex programmable logic device (CPLD) to control reset and timing sequences during the pre-boot operations.

7. The apparatus of claim 6, wherein the CPLD is within the security circuitry.

8. The apparatus of claim 1, wherein the security circuitry to monitor and filter bus transactions during boot and runtime.

9. A method comprising:
receiving alternating current (AC) power;
performing secure pre-boot operations using at least a security circuit to:
perform signature verification of an active portion of firmware and a recovery portion of firmware in a firmware storage hardware,
not allow boot upon a signature verification failure of the recovery portion of firmware,
initiate recovery upon a signature verification failure of the active portion of firmware and a signature verification pass of the recovery portion of firmware, and
allow boot when the signature verification of the active portion of firmware and the recovery portion of firmware passes;
powering down direct current (DC) power to any hardware processor in operation during secure pre-boot; and
powering on DC power to hardware processors and performing a normal boot after the secure-boot operations determine to allow boot.

10. The method of claim 9, wherein the secure pre-boot operations comprise:
powering up one hardware processor in a plurality of hardware processors and holding components that access firmware in reset;
holding other platform components that access firmware in reset;
calculating signatures of active and recovery partitions in flash using both a public and a private key.

11. The method of claim 10, wherein the private key is stored in fuses of the one hardware processor.

12. The method of claim 10, wherein the private key is stored in non-volatile memory accessible to the one hardware processor.

13. The method of claim 9, further comprising:
detecting a firmware attack; and
performing secure pre-boot operations.

14. The method of claim 13, wherein the firmware attack is an attack on an active partition of firmware stored in an input/output hub flash.

15. The method of claim 14, wherein the active partition stores a basic input and output system (BIOS).

16. The method of claim 9, wherein the secure pre-boot operations are performed using the security circuit and an authenticated code module executing on a hardware processor.

17. A system comprising
a hardware processor;
firmware storage hardware to store firmware for the system; security circuitry to:
perform pre-boot operations including signature verification of an active portion of firmware and a recovery portion of firmware in a firmware storage hardware,
not allow boot upon a signature verification failure of the recovery portion of firmware,
initiate recovery upon a signature verification failure of the active portion of firmware and a signature verification pass of the recovery portion of firmware, and
allow boot when the signature verification of the active portion of firmware and the recovery portion of firmware passes.

18. The system of claim 1, wherein the hardware processor is one of a plurality of multicore hardware processors.

19. The system of claim 1, wherein the firmware is to isolate the firmware storage hardware from an input/output hub during the pre-boot operations.

20. The system of claim 1, wherein the firmware is to isolate the firmware storage hardware from a baseboard management controller during the pre-boot operations.

21. The system of claim 1, wherein the hardware processor comprises:
circuitry to verify and execute an authenticated code module stored in the firmware storage hardware during the pre-boot operations.

* * * * *